United States Patent
Ouellette et al.

(10) Patent No.: US 6,793,174 B2
(45) Date of Patent: Sep. 21, 2004

(54) PULSEJET AUGMENTOR POWERED VTOL AIRCRAFT

(75) Inventors: Richard P. Ouellette, Lakewood, CA (US); Aaron J. Kutzmann, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/245,145

(22) Filed: Sep. 16, 2002

(65) Prior Publication Data

US 2004/0118972 A1 Jun. 24, 2004

(51) Int. Cl.[7] ............................................... B64D 27/20
(52) U.S. Cl. ..................... 244/23 B; 244/23 A; 244/55; 244/58
(58) Field of Search .............................. 244/23 A, 23 R, 244/23 B, 23 C, 55, 58, 12.1, 12.3, 12.2, 73 R

(56) References Cited

U.S. PATENT DOCUMENTS

| | | | |
|---|---|---|---|
| 3,795,372 A | * 3/1974 | Feldman | 244/2 |
| 4,375,150 A | * 3/1983 | Nikiforakis | 60/39.34 |
| 4,926,818 A | 5/1990 | Oppenheim et al. | |
| 5,611,824 A | * 3/1997 | Stephens | 44/282 |
| 5,845,480 A | * 12/1998 | DeFreitas et al. | 60/776 |
| 6,112,513 A | 9/2000 | Catt et al. | |
| 6,308,898 B1 | 10/2001 | Dorris, III et al. | |

FOREIGN PATENT DOCUMENTS

| | | | |
|---|---|---|---|
| JP | 57114710 A | * 7/1982 | B60F/5/02 |

* cited by examiner

Primary Examiner—Peter M. Poon
Assistant Examiner—T. D. Collins
(74) Attorney, Agent, or Firm—Harness Dickey & Pierce P.L.C.

(57) ABSTRACT

A vertical take-off and landing (VTOL) aircraft includes separate axial and vertical propulsion sources. The vertical propulsion source includes pulsejet engines located in separate augmentor bays having apertured walls to equalize pulsejet thrust. The pulsejet engine structure is integrated with aircraft structure such that aircraft structural loads are partially carried by each pulsejet engine. Each pulsejet engine produces an aircraft vertical thrust component throttled or exhaust restricted to control aircraft ascent or descent separate from the axial propulsion source. One or more inlet cowls isolate the pulsejet engine bays. One or more outlet cowls at the exhaust bays assist in controlling pulsejet engine thrust. By using separate axial and vertical thrust sources and pulsejet engines for vertical thrust, aircraft speed, payload and operating range are improved and loss of one or more lift engines is mitigated compared to VTOL aircraft using a single propulsion source type for axial and vertical thrust.

29 Claims, 17 Drawing Sheets

US 6,793,174 B2

PULSEJET AUGMENTOR POWERED VTOL AIRCRAFT

FIELD OF THE INVENTION

The present invention relates to vertical take-off and landing (VTOL) aircraft and more specifically to a pulsejet vertical propulsion system for a VTOL aircraft.

BACKGROUND OF THE INVENTION

Vertical takeoff and landing (VTOL) aircraft are known. A variety of methods have been employed to provide vertical takeoff capability. These methods include: providing ducts to redirect the discharge from the main propulsion unit of the aircraft in a downward direction to provide vertical lift; providing a tilt mechanism to permit the main engine(s) of the aircraft to tilt and provide vertical thrust; and providing separate engines for driving fan systems to lift the aircraft. In each of the known concepts, additional components and structure are added to provide vertical thrust required for vertical takeoff. The complexity of the aircraft increases greatly when the design is modified to use an existing main engine for vertical thrust. Aircraft range and payload capabilities are reduced when weight and structural changes required to incorporate vertical takeoff engines are incorporated into an aircraft.

When an aircraft is optimized for horizontal flight, adding the capability of vertical takeoff and landing decreases its horizontal flight capabilities, i.e., speed, range and payload. If an aircraft is optimized for hovering and vertical lift capability, high speed horizontal flight capability or long range are usually lost. The complexity of an aircraft designed to accommodate both horizontal and VTOL capabilities also increases the maintenance requirements on the aircraft and therefore increases the overall life cycle costs to operate the aircraft.

Jet engine aircraft capable of VTOL flight have a normally restricted area of operation. This restriction results from the high velocity and high temperature exhaust gases exiting from the jet engine(s) which are vectored to provide VTOL capability. The high temperature and pressure gases require that special landing areas with hardened landing surfaces be provided, i.e., a concrete landing pad or a steel plate landing surface. The special landing areas prevent further damage to surrounding area, negatively impacting the surface pitch of the landing area, and minimize the chance of ingesting material into the jet engine(s). Attempting to land VTOL jet or propeller powered aircraft over non-hardened surfaces can result in a conflagration of ground or vegetation material being expelled into the atmosphere about the aircraft engines which can be entrained into the inlets of the engine causing engine damage and/or failure.

A need therefore exists for a VTOL aircraft wherein a vertical lift capability is provided which is distinct from the normal horizontal flight engine(s). A need also exists for an engine design providing vertical lift capability which exhausts at both a reduced temperature and pressure and provides a significantly simplified, durable engine design which allows a multitude of vertical lift engines to be provided for redundancy, while providing engines less susceptible to damage from ingestion of ground debris.

SUMMARY OF THE INVENTION

According to a preferred embodiment of the present invention, a vertical takeoff and landing (VTOL) aircraft provides separate axial and vertical propulsion sources including at least one pulsejet engine for vertical propulsion.

According to one preferred embodiment, each pulsejet engine is provided in a separate augmentor bay. The augmentor bay includes an inner and outer wall provided to support the pulsejet engine, and a pair of apertured sidewalls. The apertures in the sidewalls provide for equalization flow between discharges of adjacent pulsejet engines. Equalizing the discharge from each of the pulsejet engines allows the thrust to be balanced across a bank of pulsejet engines. Therefore, if an individual pulsejet engine is operating above or below a desired operating condition, the resultant thrust from the individual pulsejet engine is balanced with the bank of pulsejet engines and its non-conforming condition does not jeopardize the aircraft.

The structure of the pulsejet engine of the present invention is integrated into the structure of the aircraft such that the structural loads of the aircraft are partially carried by the pulsejet and ejector engine structure. This reduces the overall weight impact on the aircraft due to addition of the pulsejet engines because separate mounting structure to support each of the pulsejet engines is not required. The pulsejet engines arranged in banks of engines are throttled using a fuel injection system, or the thrust from each individual pulsejet or bank of pulsejets can be controlled using one or more deflection plates. The deflection plates can be provided as rotatable cowls which are provided on both an inlet port of each augmentor bay and a discharge port of each augmentor bay. As known in the art, each augmentor bay provides tapered walls acting as an ejector for each pulsejet engine, thereby increasing the thrust-to-weight ratio of each pulsejet engine.

The inlet cowl isolates the entrance to each pulsejet engine bay therefore allowing the bay to be isolated from ambient conditions and prevent debris and undesirable materials from entering the pulsejet engines when the engines are shut down. The outlet cowl for the exhaust augmentor bays is provided to assist in controlling pulsejet engine thrust. The outlet cowl can be rotatably positioned ranging from fully opened to fully closed positions such that individual or groups of augmentor bays can be completely opened or partially isolated controlling vertical thrust of the aircraft, or completely isolated to prevent debris and undesirable material from entering the pulsejet engines when the engines are shut down.

The use of banks of individual pulsejet engines for vertical lift and the main engine(s) for horizontal thrust of the aircraft provides the capability of optimizing both the main engine and the VTOL engines of the aircraft. Either subsonic or supersonic speeds for an aircraft can therefore be provided because the VTOL pulsejet engine banks are isolated after vertical flight is achieved.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
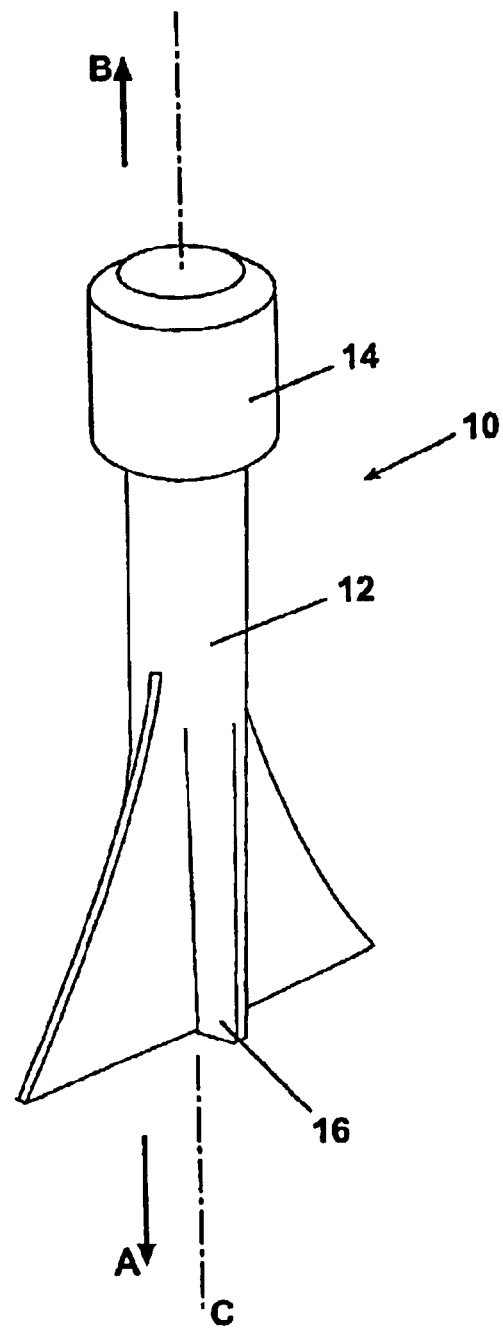
FIG. 1 is a side elevation view of a preferred embodiment of a pulsejet engine of the present invention.

Referring to FIG. 1, a pulsejet engine 10 is shown. The pulsejet engine 10 includes a body 12 having an inlet end 14 and an exhaust end 16. Propulsion thrust from the pulsejet engine 10 discharges from the exhaust end 16 in a propulsion exhaust direction A. Air, normally at atmospheric pressure, enters the inlet end 14. The air mixes with a fuel (discussed in reference to FIG. 11) which is detonated to produce thrust to propel a platform (not shown) in a platform travel direction B. In the exemplary preferred embodiment shown, both the air flow and the burned fuel/air mixture travel in the propulsion exhaust direction A approximately parallel with a pulsejet engine longitudinal centerline C.

Figure 2:
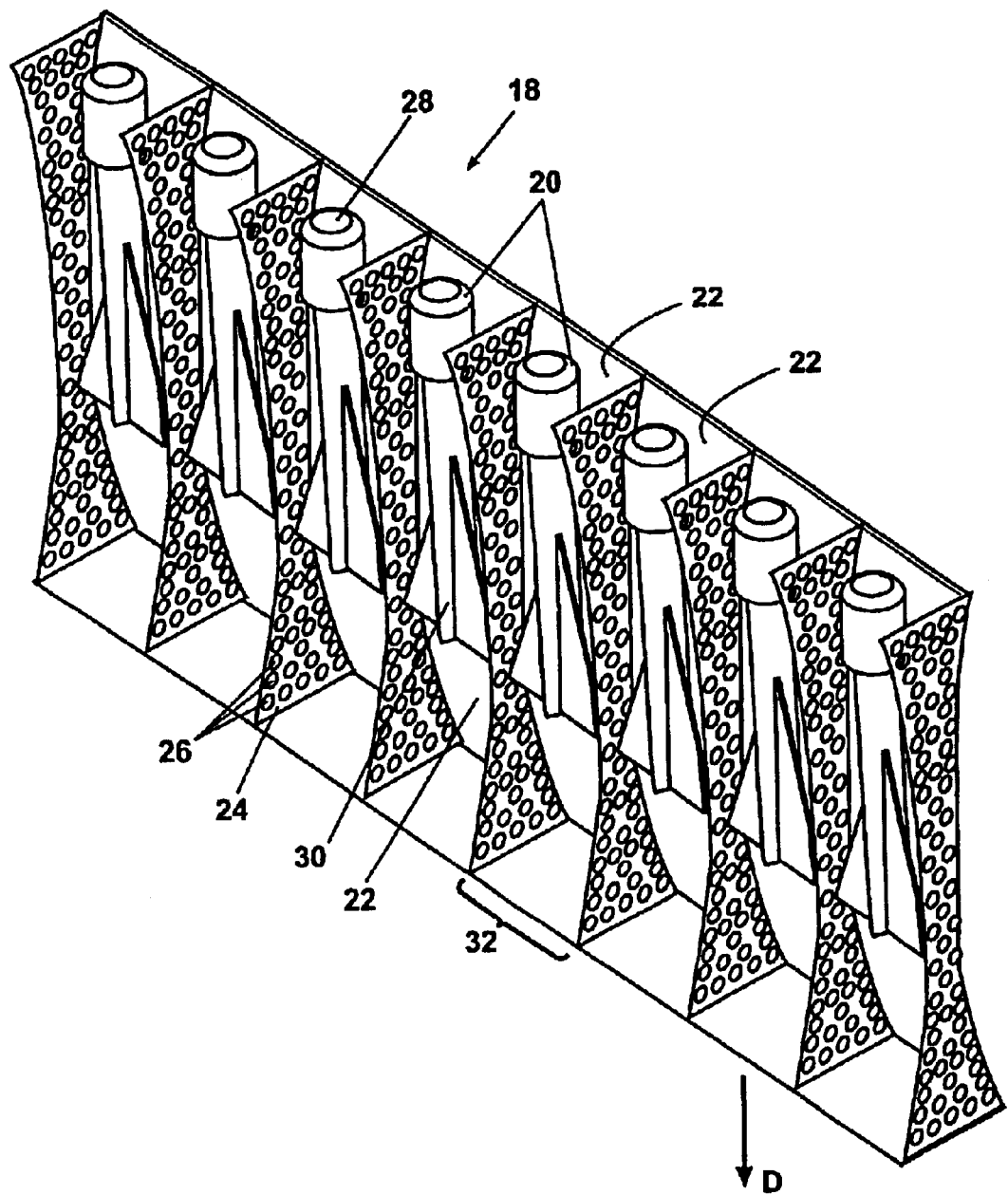
FIG. 2 is a perspective view of a group of pulsejets of FIG. 1 having ejectors wherein the ejectors are formed as augmentor cells of the present invention.

Referring to FIG. 2, an exemplary pulsejet bank 18 is shown. Each pulsejet bank 18 includes a plurality of pulsejets 20. Each of the pulsejets 20 is structurally attached to a sidewall 22. An opposed, second sidewall has been removed from the view of FIG. 2 for clarity. The sidewall 22 is curved to entrain and direct air together with the pulsejet exhaust to maximize thrust from each of the pulsejets 20 in the thrust direction D shown. A plurality of end plates 24 are connectably attached to the sidewall 22 adjacent to each of the pulsejets 20. Each of the end plates 24 has a plurality of apertures 26 there through. The apertures 26 permit equalization of flow between each of the pulsejets 20 exhaust flows such that any of the pulsejets 20 within the pulsejet bank 18 which operate above or below a nominal operating condition are equalized with the remaining pulsejets 20 of the pulsejet bank 18. Air enters each of the pulsejets 20 through a pulsejet inlet 28. The exhaust gas producing thrust from each of the pulsejets 20 is discharged from a pulsejet exhaust 30 in the thrust direction D. Each adjacent pair of end plates 24 connectably joined to opposed sidewalls 22 form each of a plurality of augmentor cells 32. Only one sidewall 22 is shown in FIG. 2 for clarity. Fuel is supplied to each of the pulsejets 20 through a fuel injection system (shown and discussed with reference to FIG. 10).

Figure 3:
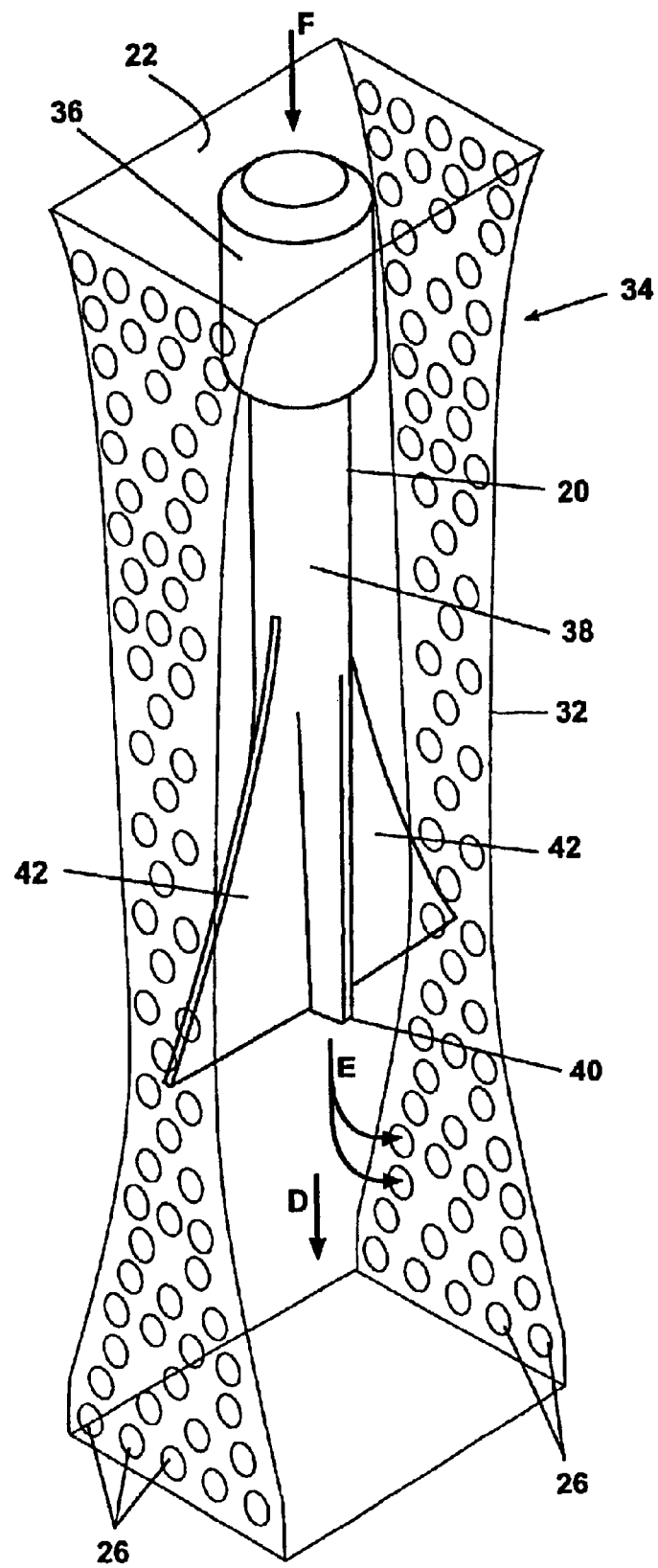
FIG. 3 is an elevation view of a single augmentor cell of the present invention having the pulsejet structurally mounted to the augmentor cell structure.

Referring now to FIG. 3, an exemplary pulsejet bay 34 is detailed. Each pulsejet bay 34 includes one augmentor cell 32 and one pulsejet 20. Each pulsejet 20 includes an inlet diffuser 36, a tuned section as a combustion chamber 38, and a discharge nozzle 40. Structural members join each pulsejet 20 with one or both of the sidewalls 22 to form a unitary load bearing structure. A plurality of hollow vanes 42 surround the discharge nozzle 40. The hollow vanes 42 serve to uniformly distribute the flow longitudinally along the augmentor cell 32 while providing structural support through the sidewalls 22 and the end plates 24. In another preferred embodiment, a plurality of webs or intercostals (not shown) join each pulsejet 20 with one or both of the sidewalls 22. Discharge from each of the pulsejets 20 is in the thrust direction D as shown. A portion of the discharge from the pulsejet 20 exits through each of the plurality of apertures 26 in an ejector cross flow direction E. Air enters the inlet diffuser 36 in the air inlet flow direction F. The inlet diffuser 36 is connectably joined to the combustion chamber 38 and the combustion chamber 38 is connectably joined to the discharge nozzle 40. In still another preferred embodiment, each of the augmentor cells 32 can also be provided as an integral unit formed from a single piece of material.

Figure 4:
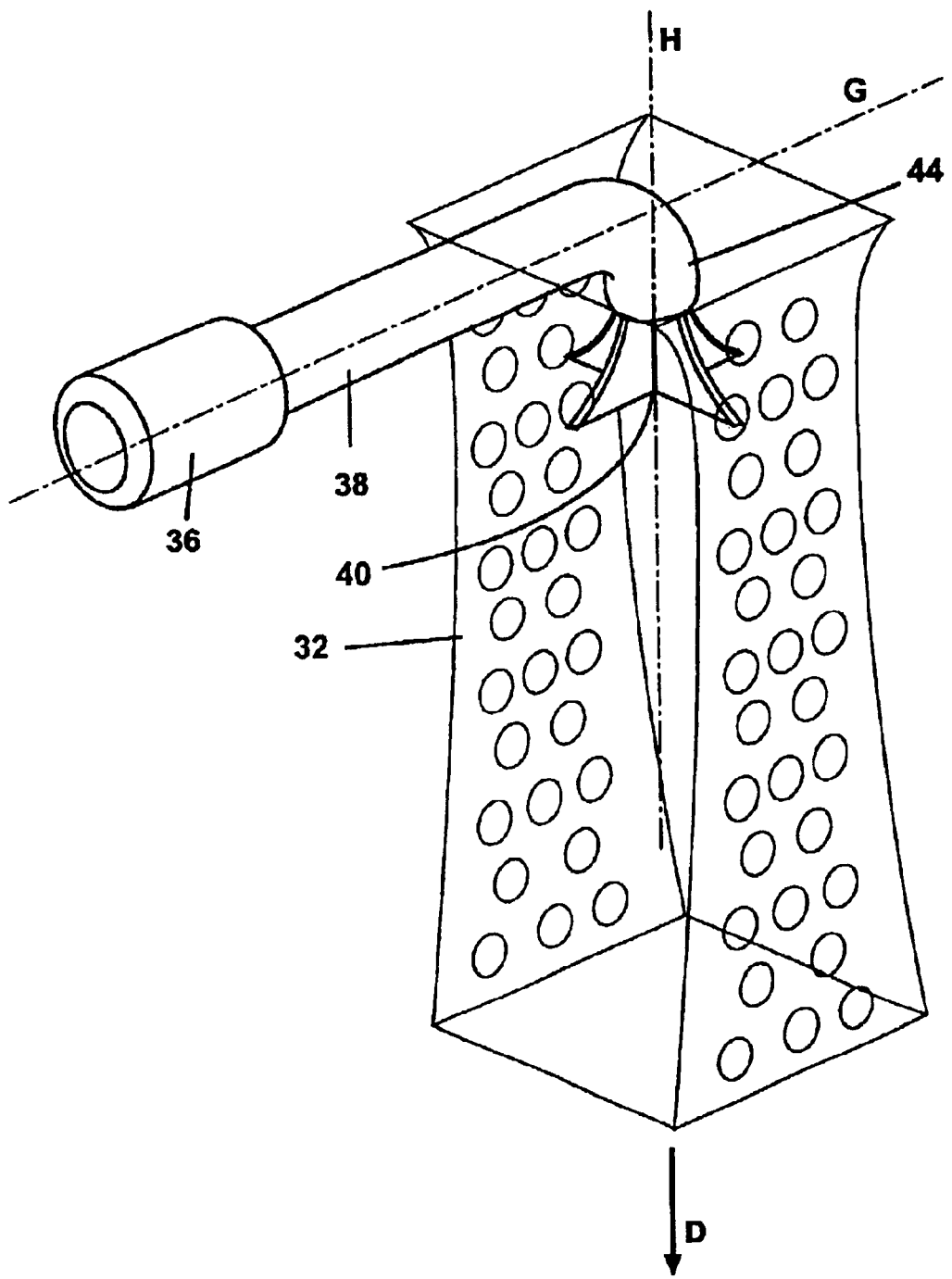
FIG. 4 is an alternate preferred embodiment of the present invention having the pulsejet inlet diffuser and combustion chamber arranged horizontally and the discharge nozzle arranged vertically to discharge downward into an ejector of the present invention.

Referring to FIG. 4, the inlet diffuser 36 and the combustion chamber 38 are co-aligned on a horizontal axis G. A bend 44 connectably joins the combustion chamber 38 to the discharge nozzle 40. The discharge nozzle 40 is aligned along a vertical axis H. The discharge nozzle 40 discharges in the thrust direction D into the augmentor cell 32. The discharge nozzle 40 preferably includes an axi-symmetric/circular shape attached to the sidewalls 22 through structural webbing (not shown). This permits the inlet for the pulsejet to be aligned horizontally while the discharge is aligned vertically providing additional flexibility in the arrangement of the pulsejets. A perpendicular alignment between the inlet and the discharge of the pulsejet are shown, however, any angle can be used to suit arrangement constraints as is reasonable for proper pulsejet 20 operation.

Figure 5:
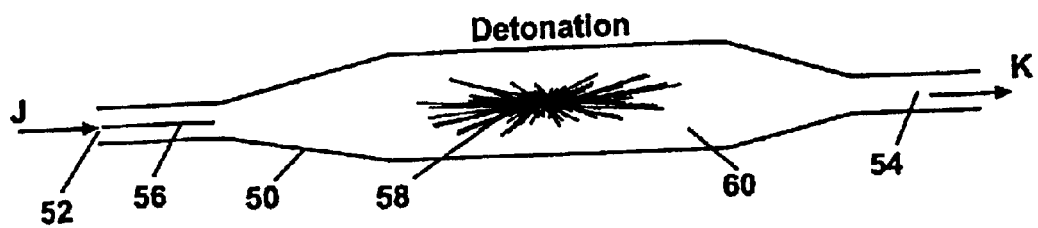
FIG. 5 is a sectioned elevation view of a conventional pulsejet during detonation.

FIGS. 5 through 9 depict a complete operating cycle for a pulsejet engine known in the art. Referring to FIG. 5, a pulsejet 50 known in the art is detailed. The pulsejet 50 includes an inlet diffuser 52 which receives air in an inlet flow direction J. An exhaust nozzle 54 discharges flow from the pulsejet 50 in an exhaust flow direction K. A mechanical valve 56 is included in the inlet diffuser 52 to prevent a backflow of detonated gas from back flowing into the inlet diffuser 52. In FIG. 5, a detonation stage of a fuel/air mixture 58 in a combustion chamber 60 is shown.

Figure 6:
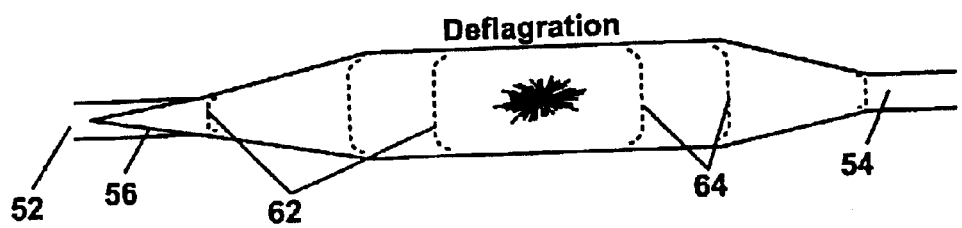
FIG. 6 is the sectioned elevation view of FIG. 5 further showing pressure waves closing a mechanical valve and providing discharge thrust.

Referring to FIG. 6, after the fuel/air mixture 58 of FIG. 5 detonates in the combustion chamber 60, a plurality of reverse pressure waves 62 are generated in a deflagration stage. The reverse pressure waves 62 and the resultant combustion gas travel toward the inlet diffuser 52 and cause the mechanical valve 56 to close preventing flow of the gas through the inlet diffuser 52. A plurality of forward pressure waves 64 is also generated during the deflagration stage. The forward pressure waves 64 and combustion gas travel in the direction of the exhaust nozzle 54 generating thrust from the pulsejet.

Figure 7:
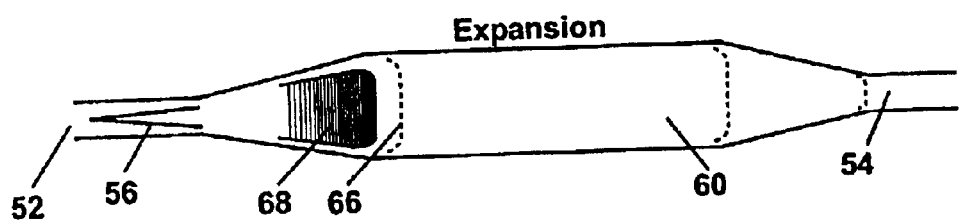
FIG. 7 is the sectioned elevation view of FIG. 6 further showing the partial opening of the mechanical valve and inflow of a fuel/air mixture into the combustion chamber.

Referring to FIG. 7, after a majority of the combustion gas exhausts through the exhaust nozzle 54, the pressure in the combustion chamber 60 reduces and the pressure of the air supply at the inlet diffuser 52 opens the mechanical valve 56. As the mechanical valve 56 opens, a new supply of air and fuel enters the combustion chamber 60. A plurality of air expansion pressure waves 66 lead a fuel/air mixture 68 into the combustion chamber 60.

Figure 8:
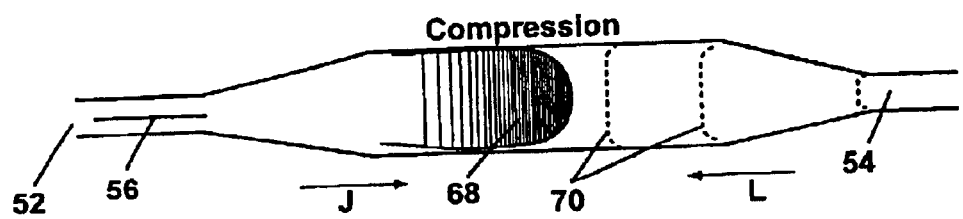
FIG. 8 is the sectioned elevation view of FIG. 7 further showing a fully opened mechanical valve and a fuel/air mixture compression cycle.

Referring to FIG. 8, in a compression stage compression of the fuel/air mixture 68 begins to occur in the combustion chamber 60. The mechanical valve 56 is fully open allowing air flow through the inlet diffuser 52 in the inlet flow direction J. A plurality of high temperature discharge nozzle backpressure waves 70 reflect from the exhaust nozzle 54. The discharge nozzle backpressure wave 70 temperature is approximately 1,500 degrees Fahrenheit (815° C.). The discharge nozzle backpressure waves 70 travel in the nozzle backpressure direction L. When the discharge nozzle backpressure waves 70 contact the fuel/air mixture 68 the fuel/air mixture 68 initially compresses in the combustion chamber 60.

Figure 9:
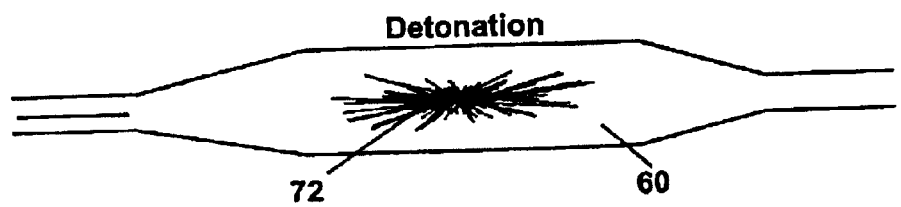
FIG. 9 is the sectioned elevation view of FIG. 8 further showing a fuel/air mixture detonation following a collision between the fuel/air mixture with reflected backpressure waves from a previous detonation.

Referring to FIG. 9, when the high temperature discharge nozzle backpressure waves 70 contact the fuel/air mixture 68 (shown in FIG. 8), and the fuel/air mixture 68 temperature rises to its ignition temperature, a detonation of the fuel/air mixture 68 occurs in the combustion chamber 60. The fuel/air mixture 68 detonates at a fuel/air detonation point 72 and a new cycle for the pulsejet 50 begins. The detonation, exhaust, compression and new detonation cycle occurs rapidly in the pulsejet engine, i.e., approximately 60 to 100 cycles per second as is known in the art. Fuel is either continuously pressurized and fed by a fuel injection system (shown and discussed in reference to FIG. 10), or is pulse pressurized to enter at the optimum time of each engine operating cycle. Detonation is normally initiated and can also be controlled using a detonation device (not shown) such as a spark plug.

Figure 10:
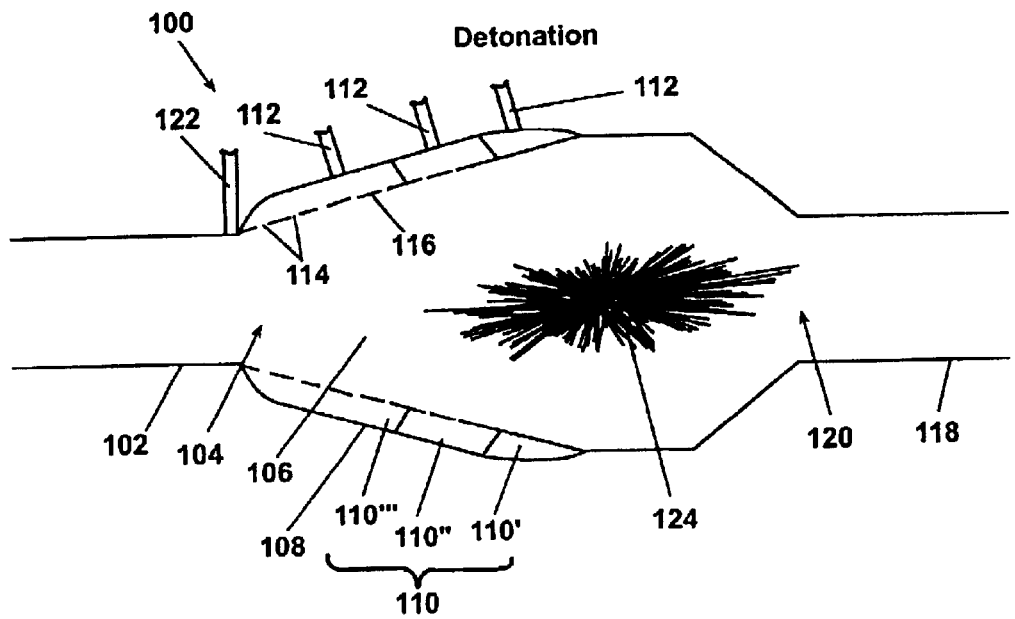
FIG. 10 is a sectioned elevation view of a preferred embodiment of a pulsejet engine of the present invention during a detonation cycle.

FIGS. 10 through 13 show a single cycle of operation of a pulsejet applied in the present invention. Referring to FIG. 10, a pulsejet 100 includes an inlet diffuser 102 connected to an upstream inlet port 104 of a combustion chamber 106. The combustion chamber 106 is enveloped by a boundary layer air plenum 108. The boundary layer air plenum 108 provides a plurality of side injection boundary layer air ports 110, (designated as exemplary boundary layer air ports 110', 110", and 110''') for introduction of a boundary layer air supply (not shown) through at least one supply line 112. The source for boundary layer air can include compressed air, oxygen generating candles, or bleed air. Boundary layer air enters the combustion chamber 106 through a plurality of apertures 114 in a body section 116 (shown in an exemplary conical shape) of the combustion chamber 106. The apertures 114 in the body section 116 can have the same aperture size, or can increase or decrease in size, as viewed in FIG. 10, from right to left as the apertures 114 are positioned along the body section 116. The body section 116 and the combustion chamber 106 can also be provided in other geometric shapes. One or more boundary layer air ports 110 can be used.

The combustion chamber 106 tapers down and connects to a discharge nozzle 118 at a downstream exit port 120. A fuel supply (not shown) is fed or injected into the inlet diffuser 102 upstream of the upstream inlet port 104 through one or more fuel supply lines 122. Fuel supply lines 122 can also enter the combustion chamber 106, or divide between both the upstream inlet port 104 and the combustion chamber 106. A detonation stage is depicted in FIG. 10. A fuel and air mixture detonates in the combustion chamber 106 at a fuel/air detonation point 124.

Figure 11:
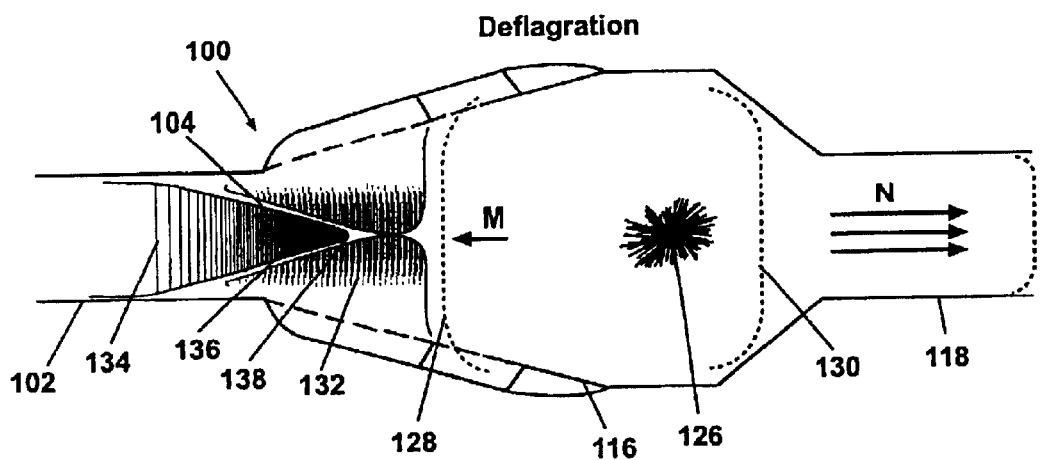
FIG. 11 is the sectioned elevation view of FIG. 10 further showing the deflagration step following detonation wherein the air and fuel flow are choked off by compression of boundary layer injection air flow by the pressure wave generated during the detonation phase.

Referring to FIG. 11, following the detonation stage shown in FIG. 10, a deflagration stage of the pulsejet 100 is shown. A fuel/air deflagration mixture 126 is shown. As the fuel/air mixture continues to burn and expand beyond the fuel/air deflagration mixture 126, a plurality of reverse pressure waves 128 form. The reverse pressure waves 128 travel in the reverse pressure wave direction M toward the inlet diffuser 102 (shown in FIG. 10). A plurality of forward pressure waves 130 also form. The forward pressure waves 130 travel in the thrust direction N into the discharge nozzle 118. The reverse pressure waves 128 contact an entering boundary layer air volume 132 and compress the boundary layer air volume 132 in the direction of the inlet diffuser 102.

A fresh air stream 134 combines with fuel supplied through the fuel supply line 122 (shown in FIG. 10) to form a fuel/air mixture 136. The boundary layer air volume 132 contacts the fuel/air mixture 136 and a choke point 138 is formed. At the choke point 138, the pressure of the now compressed boundary layer air volume 132 equals or exceeds the pressure of the fresh air stream 134 and further flow of the fresh air stream 134 into the combustion chamber 106 is temporarily blocked. The pressure of the boundary layer air volume 132 driven by the reverse pressure waves 128 also exceeds the pressure of the fuel injection system (not shown) at the fuel supply line 122, or a sensor of the fuel injection system signals a fuel cut-off therefore preventing input of fuel during the deflagration stage.

High pressure within the combustion chamber 106 still exists at the stage where the choke point 138 is created. The pressure in the combustion chamber 106 is relieved as thrust in the thrust direction N as the forward pressure waves 130 travel toward the discharge nozzle 118. The high pressure of the reverse pressure waves 128 force more and more of the boundary layer air flow injected through the boundary layer air plenum 108 (shown in FIG. 10) away from the discharge nozzle facing end of the boundary layer air plenum 108 towards the inlet diffuser facing end. Boundary layer air flow is constricted to flow through an increasingly smaller injection area which causes the velocity and subsequent penetration of the boundary layer air flow into the fresh air stream 134 to increase. In effect, this creates a pneumatic throat or venturi which not only chokes the fresh air stream 134 from entering the pulsejet 100, but also prevents combustion byproducts from exiting the engine via the inlet diffuser 102. The choke point 138 location is determined in part by the shape of the body section 116 of the combustion chamber 106, and by the pressure of the reverse pressure waves 128.

Figure 12:
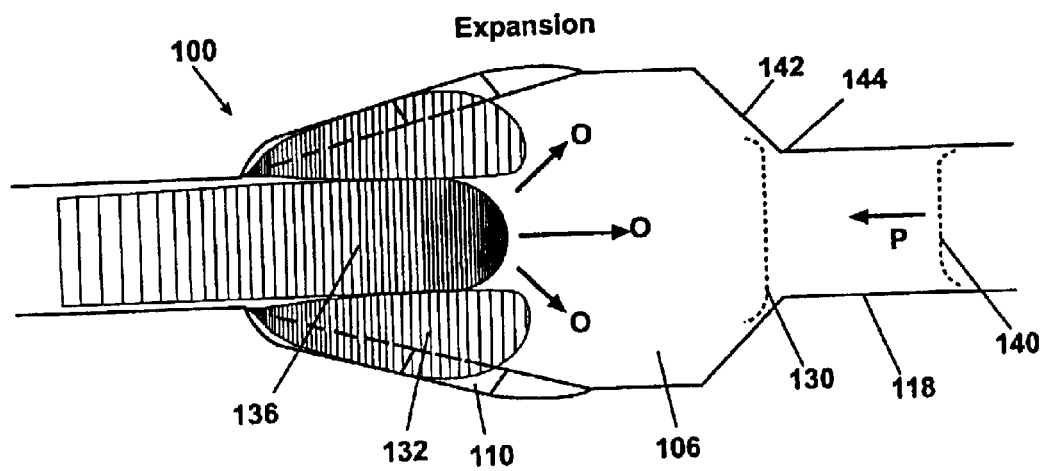
FIG. 12 is the sectioned elevation view of FIG. 11 further showing the expansion of a fuel/air fuel mixture into the combustion chamber of a pulsejet engine of the present invention following thrust exhaust of the previously detonated air fuel mixture.

Referring now to FIG. 12, during an expansion stage the deflagration pressure and its effect on the boundary layer air volume 132 is reduced by thrust discharge through the discharge nozzle 118 and back reflection of the reverse pressure waves 128 from the choke point 138 (identified in FIG. 11). The reverse pressure waves 128, traveling in the direction P, encounter the choked flow, reflect and travel in the direction of expansion direction arrows O. This reflection, together with the forward pressure waves 130 exiting the combustion chamber 106, create a diffusion process which subsequently decreases the pressure in the combustion chamber 106. The pressure differential between the fuel/air mixture 136 and the pressure in the combustion chamber 106 causes the fuel/air mixture 136 to flow again into the combustion chamber 106 in the direction of expansion arrows O.

The reduced pressure in the combustion chamber 106 allows the boundary layer air volume 132 to redistribute itself throughout the boundary layer air plenum 108 (described in reference to FIG. 10) and the combustion chamber 106 from the boundary layer air ports 110. As the boundary layer air flow is redistributed, it is allowed to pass through an ever increasing passage porosity (i.e., the injection area increases). With constant injection pressure and airflow, an increased area necessitates lower velocity injection due to fundamental gas laws. A lowered combustion chamber pressure and increased fresh air charge also help guide the boundary layer air flow to the outer combustor walls of the body section 116. This serves to partially cool and isolate the hot combustor section from the inlet and also stabilizes subsequent combustion processes by focusing the combustion processes toward the fuel/air detonation point 124 (shown in FIG. 10). In this expansion stage, the forward pressure waves 130 have reached the discharge nozzle 118. A plurality of discharge nozzle back-pressure waves 140 in the form of rarefaction waves begin to form in this stage. The discharge nozzle back-pressure waves 140 create a sub-ambient expansion which partially induces ejector airflow and combustion byproducts from the last cycle into the discharge nozzle 118. The discharge nozzle back-pressure waves 140 also travel in the direction P.

Figure 13:
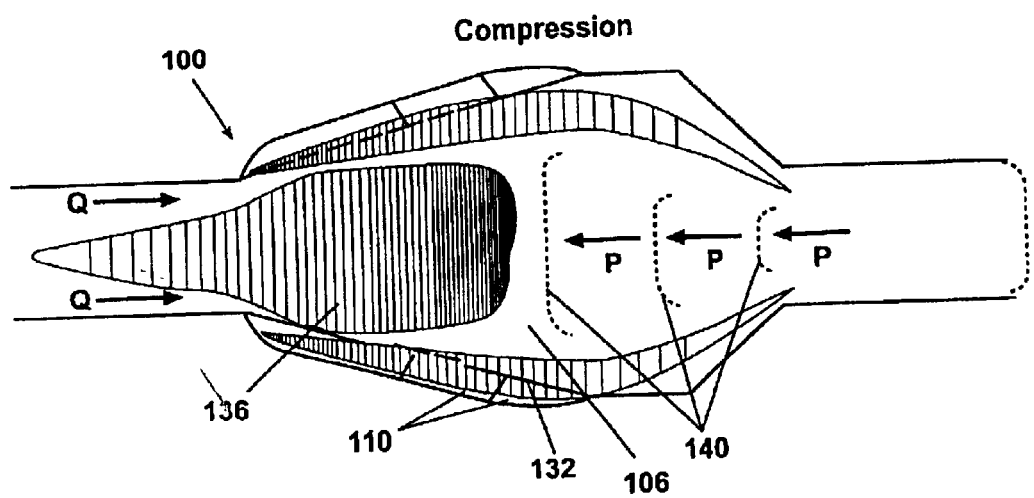
FIG. 13 is the sectioned elevation view of FIG. 12 further showing the fuel/air mixture in the combustion chamber colliding with reflected pressure waves from the discharge nozzle of the pulsejet of the present invention prior to detonation of the air fuel mixture.

Referring now to FIG. 13, in a compression stage the fuel/air mixture 136 traveling in an fuel/air flow direction Q begins to contact the discharge nozzle back-pressure waves 140. The fuel/air mixture 136 begins to compress in the combustion chamber 106. A stabilizing volume of the previously expanded boundary layer air volume 132 is shown as it compresses along the perimeter of the combustion chamber 106. The compression stage shown in FIG. 13 shows the plurality of discharge nozzle back-pressure waves 140 immediately before detonation of the fuel/air mixture 136 similar to the detonation shown in FIG. 10. Detonation begins a new cycle for the pulsejet.

Referring back to FIG. 12, the combustion chamber 106 includes a taper section 142. The taper section 142 ends at a taper distal end 144 which is the connecting point for the discharge nozzle 118. The geometry of the taper section 142 also helps provide the constriction of the out flowing gases and the generation of the discharge nozzle back-pressure waves 140.

Figure 14:
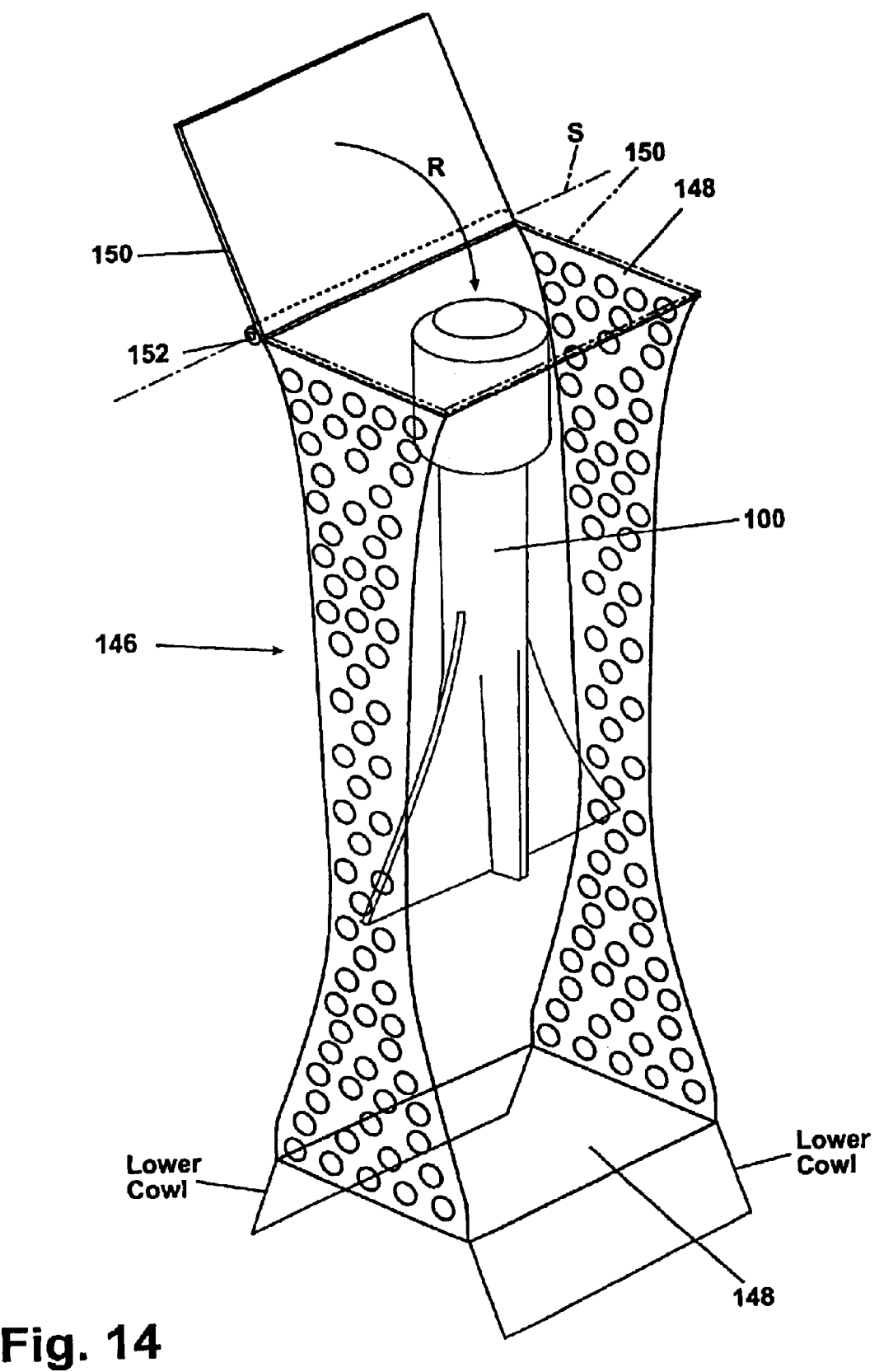
FIG. 14 is the sectioned elevation view of FIG. 3 further showing a rotatable cowl at an inlet aperture of the pulsejet of the present invention.

Referring to FIG. 14, an exemplary pulsejet bay 146 as applied in the present invention is shown. An upper aperture 148 of the pulsejet bay 146 can be partially or completely closed by a cowl 150. In the exemplary embodiment shown, the cowl 150 is mounted to the pulsejet bay 146 by a hinge 152 or similar mechanical element. The cowl 150 rotates along an arc R about a hinge center-line S to the closed, phantom position shown. The cowl 150 is controlled by a control system (not shown). Air inlet flow to the pulsejet 100 in the pulsejet bay 146 can be controlled by the single cowl 150 shown or by two or more cowls (not shown) similar to the cowl 150. Similar devices provided at the bottom aperture 148 of each of the pulsejet bays 146 can be used to control the thrust produced in each pulsejet bay 146. In another preferred embodiment, the cowl 150 is provided as a flexible member which rolls out from a reel (not shown) which replaces the hinge 152, to the closed, phantom position shown.

Figure 15:
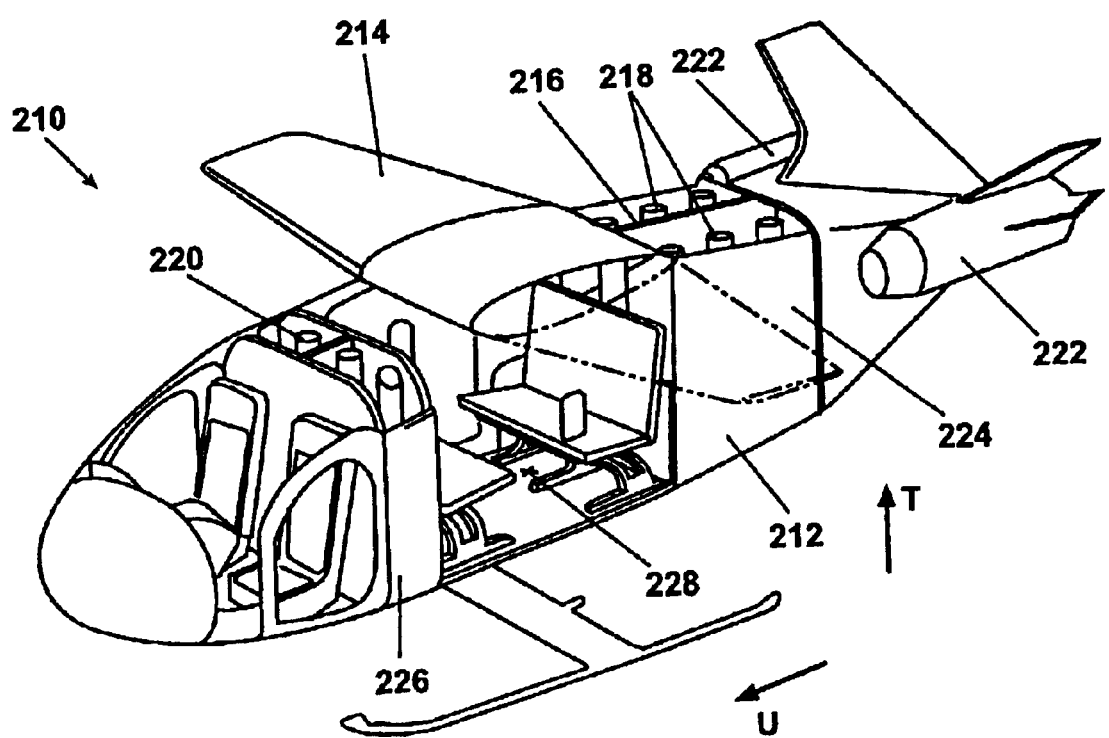
FIG. 15 is a perspective view of an exemplary aircraft of the present invention having both conventional main propulsion engines for horizontal flight and multiple banks of pulsejet engines providing for VTOL capability.

Referring to FIG. 15, an exemplary VTOL aircraft 210 according to a preferred embodiment of the present invention is shown. The VTOL aircraft 210 structurally includes a fuselage 212 and a pair of flight wings 214. To provide VTOL capability, a plurality of pulsejet/ejector banks are provided. A pair of pulsejet/ejector aft banks 216 and a pulsejet/ejector forward bank 220 are provided. Each of the pulsejet/ejector aft banks 216 and the pulsejet/ejector forward bank 220 include a plurality of pulsejet engines 218.

The pulsejet/ejector aft banks 216 and the pulsejet/ejector forward bank 220 provide vertical takeoff capability in the vertical lift direction T. In order to provide horizontal or axial flight capability for the VTOL aircraft 210, a pair of main flight engines 222 are shown as known in the art. The main flight engines 222 provide for axial flight of the VTOL aircraft 210 in an axial flight direction U.

The pulsejet/ejector aft banks 216 are provided in an aft compartment 224 of the VTOL aircraft 210. The structure supporting each of the pulsejet engines 218 is integrated into the aft compartment 224 such that structural loads of the VTOL aircraft in the aft compartment 224 area are at least partially supported by the pulsejet/ejector aft banks 216. Similarly, structure of the pulsejet/ejector forward bank 220 is integrated into the VTOL aircraft 210 in a forward compartment 226. The vertical thrust generated by each of the pulsejet/ejector aft banks 216 and the pulsejet/ejector forward bank 220 is centered about a VTOL aircraft 210 center of gravity 228. By centering the pulsejet banks about the center of gravity 228, individual pulsejet engines 218 can be throttled to affect the attitude of the VTOL aircraft 210 during takeoff and landing procedures.

Figure 16:
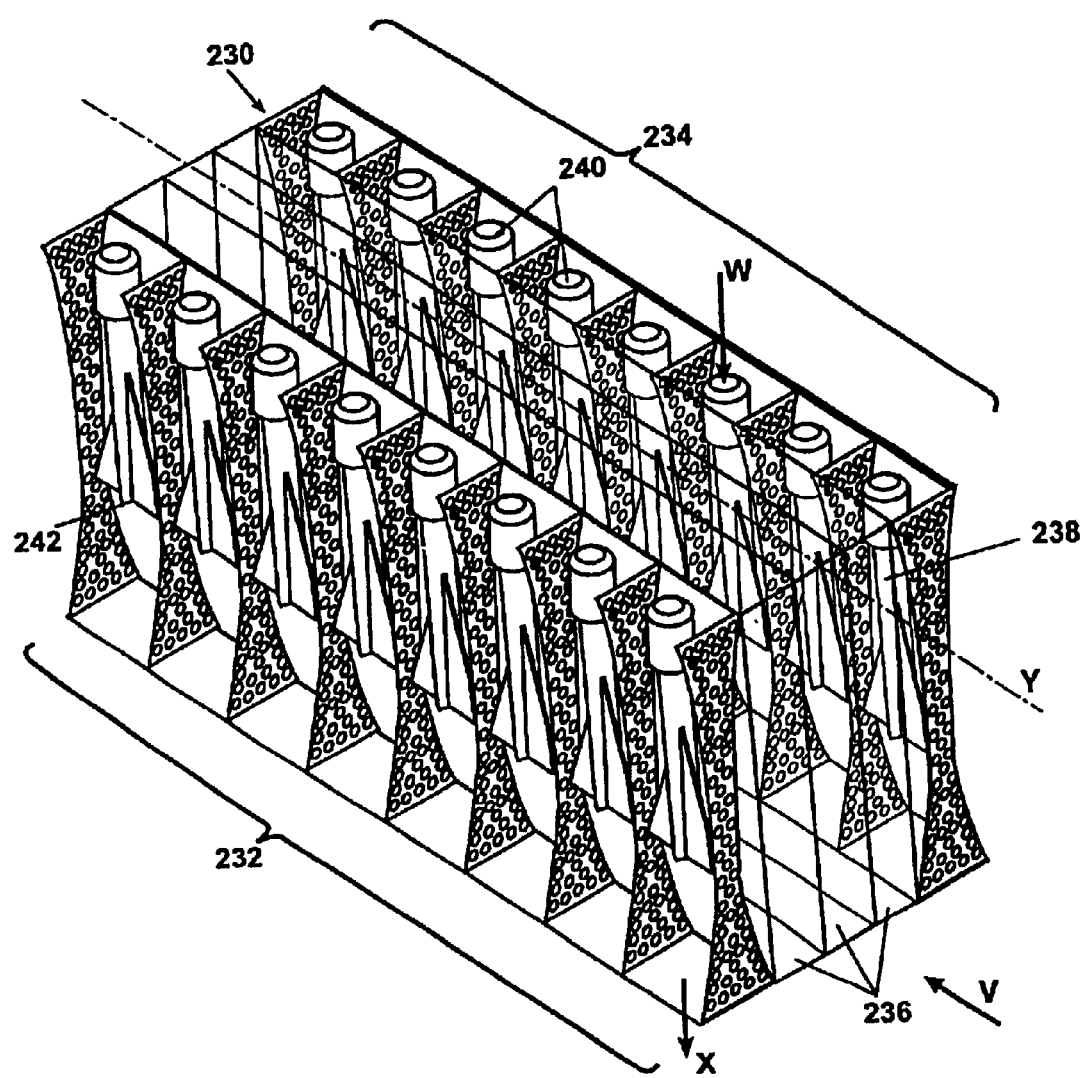
FIG. 16 is a perspective view of an exemplary arrangement of two banks of pulsejet engines separated by typical structure of an aircraft.

Referring now to FIG. 16, another preferred embodiment for pulsejet/ejector banks of the present invention is shown. The pulsejet/ejector bank 230 includes a pulsejet/ejector port bank 232 and a pulsejet/ejector starboard bank 234, respectively. One or more interior compartment bays 236 are provided between both the pulsejet/ejector port bank 232 and the pulsejet/ejector starboard bank 234. The interior compartment bay(s) 236 can be used for a variety of aircraft purposes, including stowage, fuel stowage, acoustic isolation, and personnel spaces, (e.g., with exterior compartments used for fuel volume, or vice versa, with exterior compartments used for payload such as antennae).

Each pulsejet 238 includes an inlet diffuser 240 wherein ambient air is drawn into the pulsejet 238, and an exhaust nozzle 242 where exhaust gases generating vertical thrust by each of the pulsejets 238 discharge. Forward thrust is provided by the main flight engines 222 (shown in FIG. 15) to provide thrust to propel the VTOL aircraft 210 in the aircraft forward direction V. Ambient air enters each of the pulsejets 238 in the air inlet direction W. Exhaust gases generating vertical thrust by each of the pulsejets 238 discharges from the pulsejets 238 in the thrust direction X. In the exemplary arrangement shown by FIG. 16, both the pulsejet/ejector port bank 232 and the pulsejet/ejector starboard bank 234 are approximately equally spaced about an aircraft longitudinal centerline Y.

Figure 17:
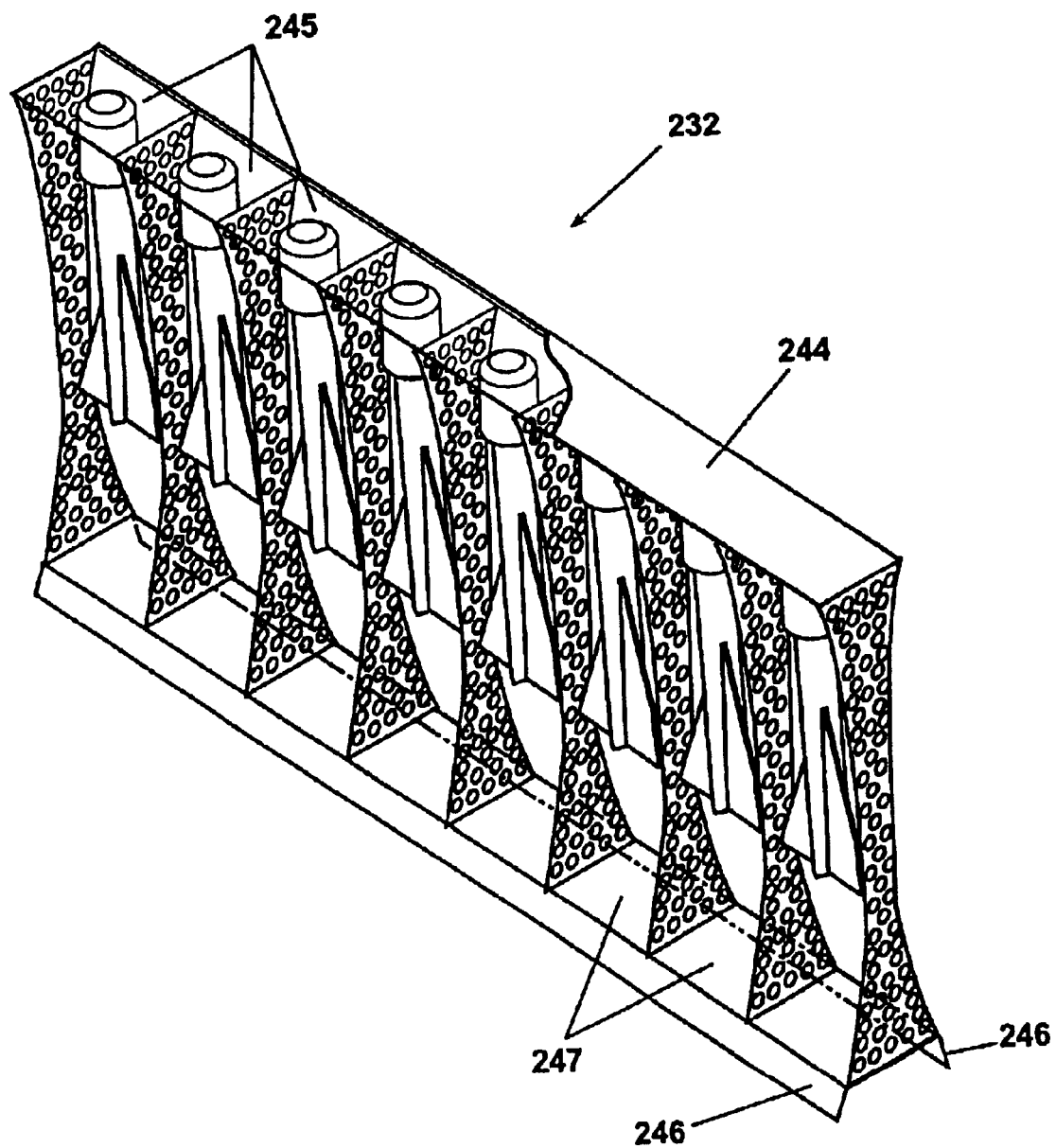
FIG. 17 is a perspective view of an individual bank of pulsejet engines showing the inlet and outlet cowls used to either isolate or control and trim the pulsejet engines.

Referring to FIG. 17, the pulsejet/ejector port bank 232 of FIG. 16 is shown in greater detail. An inlet cowl 244 is partially shown in a closed position isolating augmentor bays 245. The inlet cowl 244 is shown as a unitary cowl capable of isolating all of the pulsejets of the pulsejet/ejector port bank 232. The inlet cowl 244 can also be provided as individual cowls isolating each of the augmentor bays 245 individually.

A pair of exhaust cowls 246 are joined to the pulsejet/ejector port bank 232 at each of a plurality of augmentor bay exhaust ports 247. The pair of exhaust cowls 246 are rotatably attached to the structure of the pulsejet/ejector port bank 232 and operate from a fully open to a fully closed position for the augmentor bay exhaust ports 247. By rotating one or both of the exhaust cowls 246, or modifying the fuel supply, discharge thrust from the pulsejets in the pulsejet/ejector port bank 232 can be controlled. Similar to the inlet cowl 244, the exhaust cowls 246 can also be completely shut to provide isolation of one or all of the augmentor bays 245. The exhaust cowls 246 can also be provided, similar to the inlet cowl 244, as individual cowls (not shown) isolating each of the augmentor bay exhaust ports 247, or an intermediate number of cowls isolating 2 or more bays (not shown). Depending upon the simplicity of the design desired, either or both the inlet cowl 244 and the exhaust cowls 246 can be eliminated to reduce complexity and weight of the pulsejet bank.

Figure 18:
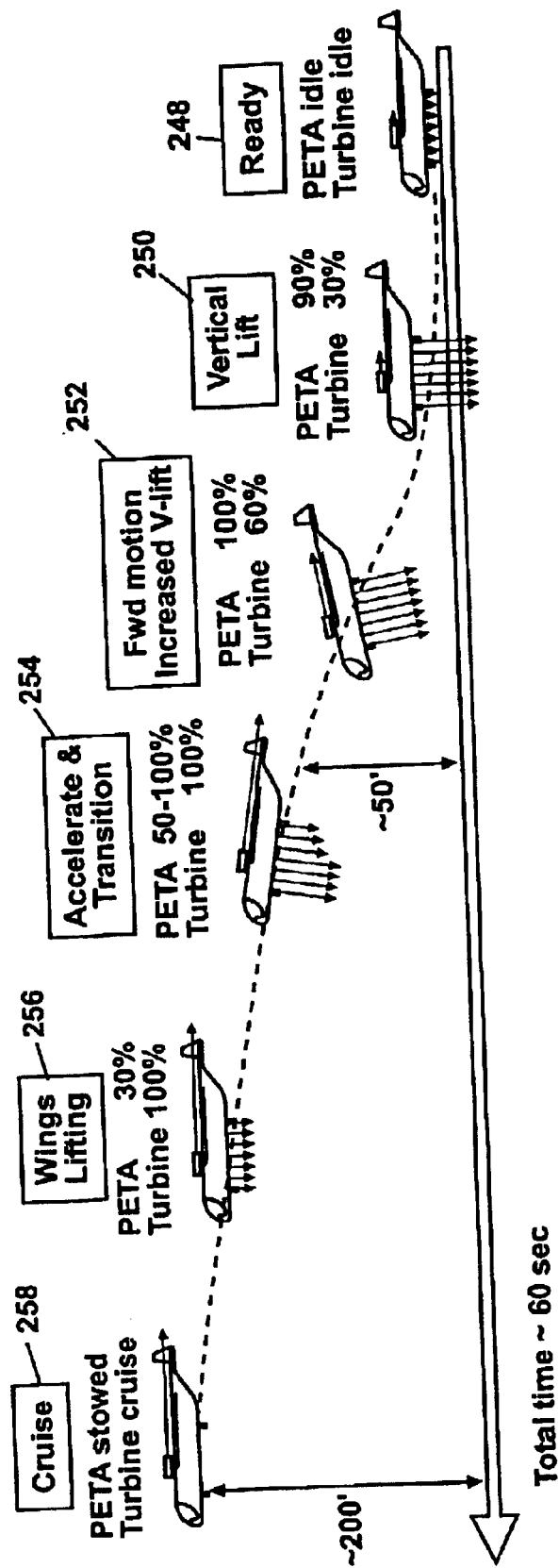
FIG. 18 is a plurality of elevation views of a VTOL aircraft of the present invention during the vertical lift stages to achieve flight.

Referring now to FIG. 18, the individual operating stages of a VTOL aircraft of the present invention are shown. In a ready step 248, a bank of pulsejet engines in a pulsejet ejector thrust augmentor (PETA) bank are idle. The main propulsion turbine engines are also idle. In a vertical lifting step 250, the PETA banks power level are increased to approximately 90%. The main propulsion engine(s) power is increased to approximately 30%. Initial vertical lift of the aircraft begins at this stage as well as horizontal motion. In a forward engine initiation step 252, PETA power is increased to full 100% power and the main propulsion engine(s) power is increased to approximately 60%. The aircraft pitches nose down and the PETA power assists in accelerating the aircraft. In a transitioning step 254, the PETA power decreases in a range between approximately 100% to 50% power. The pulsejet engines are slowly throttled down during this step and the main propulsion engine(s) power is increased to 100% to transition to horizontal flight. As the aircraft transitions, the nose is pitched up and the wings begin to generate lift. In an acceleration step 256, the PETA engines are reduced in power to approximately 30% and the main propulsion engine power is maintained at 100%. Aircraft acceleration continues and the pulsejet engine power is significantly reduced as the aircraft approaches its nominal flight speed. At this point, the full weight of the aircraft is supported by its wings. In a cruise step 258, normal horizontal flight of the aircraft is achieved. The banks of PETA engines are shut down during this stage and the inlets to the PETA engines are isolated. Main propulsion turbine engines are throttled as required during this final stage where normal aircraft cruising speed has been achieved. In the exemplary arrangement shown in FIG. 18, an exemplary time of about 60 seconds elapses between the ready step 248 and the cruise step 258.

Figure 19:
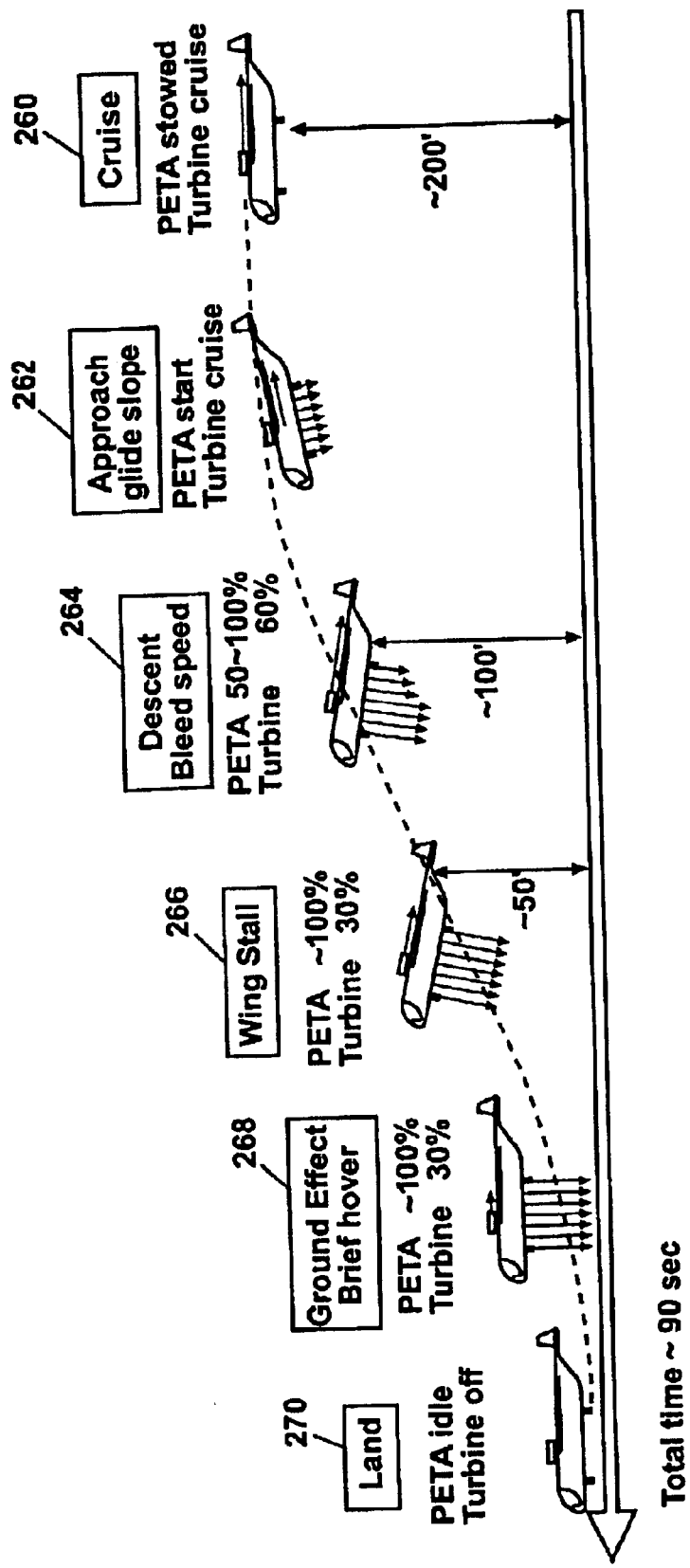
FIG. 19 is a plurality of elevation views similar to FIG. 18 showing a VTOL aircraft of the present invention during the various stages of a landing procedure.

Referring now to FIG. 19, in a cruise step 260, similar to the cruise step 258 shown in FIG. 18, the PETA engines are in their stowed and powered down conditions and the main propulsion engines of the aircraft are in their normal cruise condition. In an initiating step 262, the PETA engines are initiated and the aircraft is maneuvered into a descent orientation. In a descent step 264, aircraft speed is reduced by reducing the main propulsion engine power from 100% to approximately 50% while increasing the PETA engine power up to approximately 60%. In a stalling step 266, the aircraft is positioned to stall the wings of the aircraft. The main propulsion engine power is further decreased to approximately 30% and the PETA engines are throttled up to provide just below a climbing power. In a hovering step 268, the PETA engines are just below 100% operating power (just below climbing power) and the aircraft is in a brief hover mode. Main propulsion engine power is retained at about 30% power during this stage to provide minimum forward thrust of the aircraft. In a landing step 270, the aircraft has landed and the PETA's engines are idled and the main propulsion engines are shut down. Any cowls on the PETA engines are isolated at this time. In the exemplary configuration shown in FIG. 19 for a landing procedure, an exemplary time of approximately 90 seconds elapses to bring the aircraft from an altitude of approximately 200 feet to a landing position.

Figure 20:
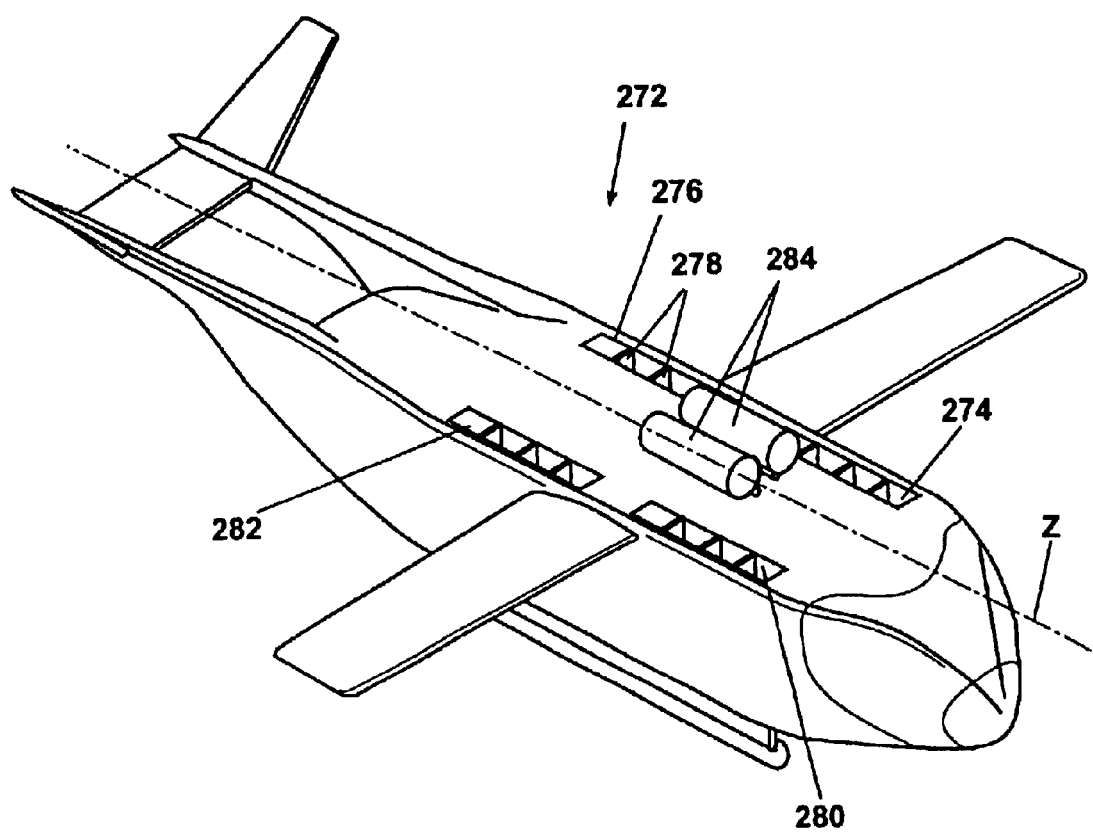
FIG. 20 is a perspective view of another embodiment of a VTOL aircraft of the present invention showing a side to side balanced configuration of pulsejet engine banks.

Referring now to FIG. 20, another preferred embodiment of the present invention showing an aircraft having side to side arranged pulsejet/ejector banks is shown. A VTOL aircraft 272 includes a forward port pulsejet/ejector bank 274 and an aft port pulsejet/ejector bank 276. A plurality of augmentor bays 278 is used for each pulsejet bank. On a starboard side of the VTOL aircraft 272, a forward starboard pulsejet/ejector bank 280 and an aft starboard pulsejet/ejector bank 282 are used. Forward propulsion for the VTOL aircraft 272 is provided by a pair of main propulsion engines 284 arranged about the aircraft longitudinal centerline Z. The forward and aft arranged pulsejet banks for the VTOL aircraft 272 are equally spaced about the aircraft longitudinal centerline Z. Aircraft attitude during vertical takeoff is controlled by one or both of throttling the pulsejet engines and using discharge cowls (detailed in FIG. 17).

Figure 21:
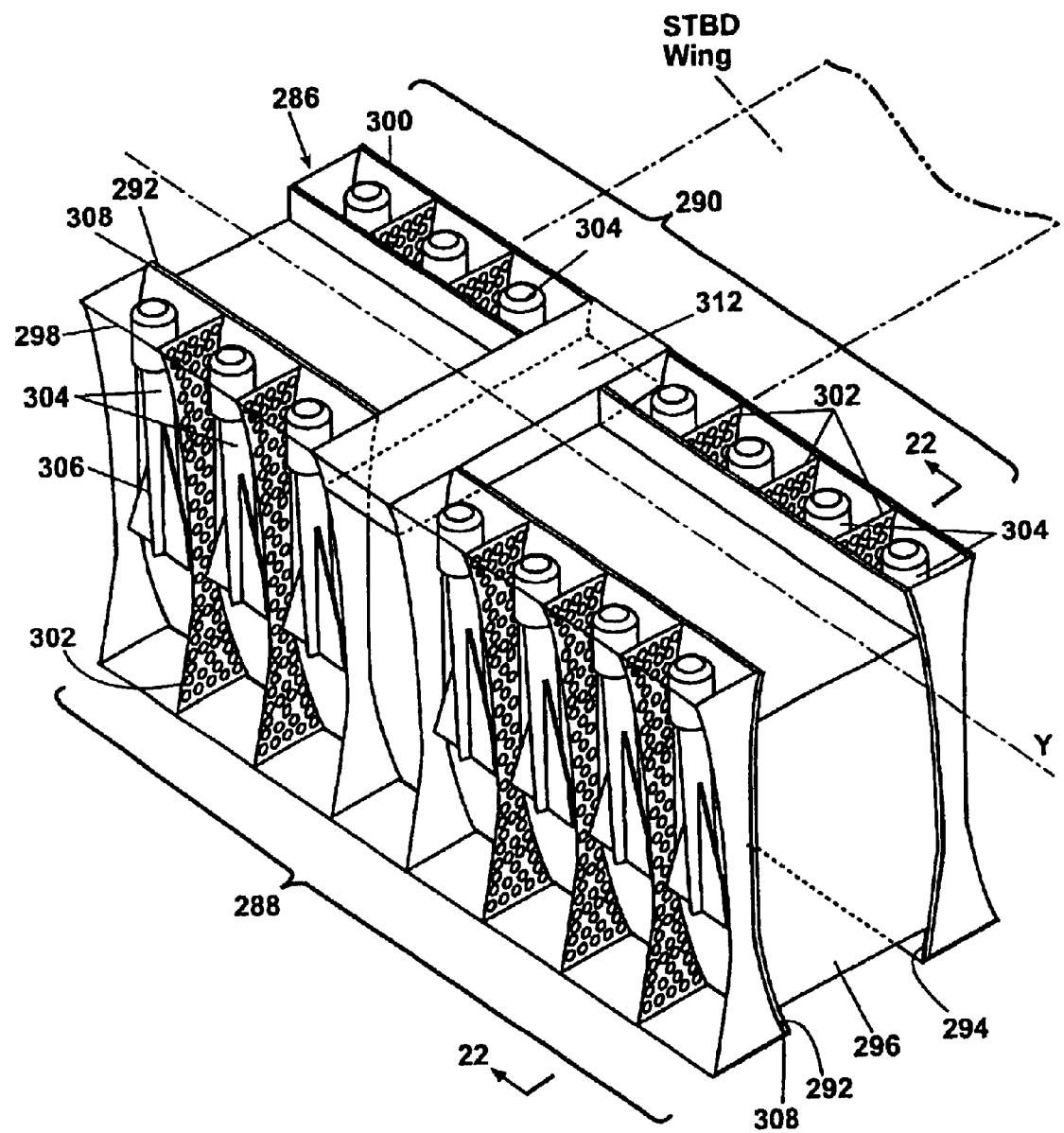
FIG. 21 is a perspective view of another embodiment similar to the exemplary arrangement of FIG. 16 showing partial exemplary structure to integrate the pulsejet banks into aircraft structures.
Figure 22:
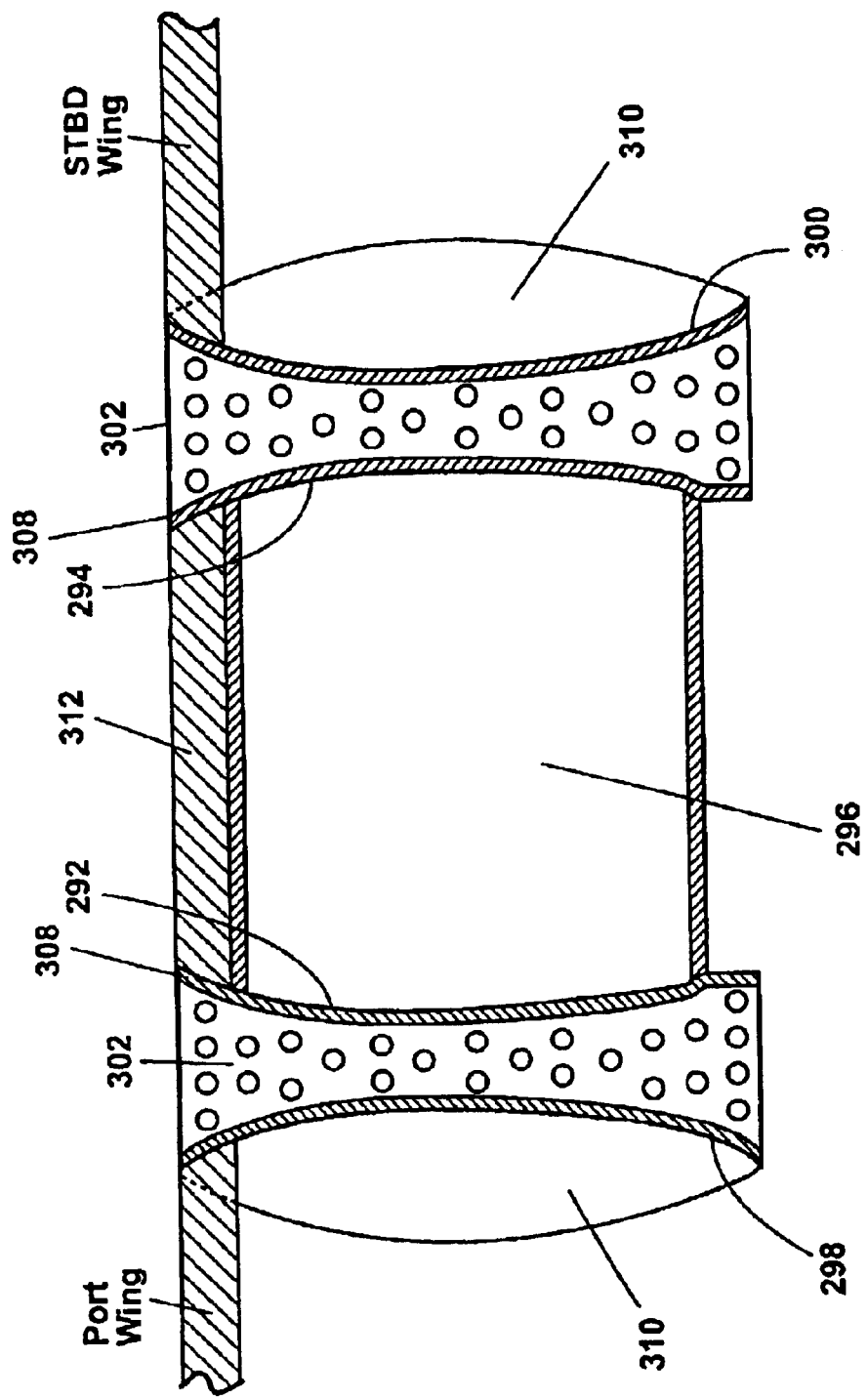
FIG. 22 is an end elevation view taken along section 22 of FIG. 21, looking forward.

Referring now to FIGS. 21 and 22, an exemplary structurally integrated pulsejet/ejector bank 286 is detailed. Both a pulsejet/ejector port bank 288 and a pulsejet/ejector starboard bank 290 are structurally integrated with aircraft structure. A port inner wall 292 and a starboard inner wall 294 form the exterior walls of an interior payload bay 296. The pulsejet/ejector port bank 288 is structurally attached to an exterior facing surface of the port inner wall 292. Similarly, the pulsejet/ejector starboard bank 290 is structurally attached to an exterior facing surface of the starboard inner wall 294. The pulsejet/ejector port bank 288 is connected to a port outer wall 298 and the pulsejet/ejector starboard bank 290 is connected to a starboard outer wall 300 by a plurality of apertured divider plates 302. The apertured divider plates 302 also provide structural rigidity for the assembly. Each of the pulsejets 304 are structurally attached to either one of the inner walls or the outer walls using one of a plurality of hollow vanes 306 provided for each pulsejet 304.

By including the structure of the pulsejet/ejector bank 286 into the aircraft, separate engine support structure which is normally used to support main flight engines, such as the main flight engines 222 shown in FIG. 15, is not required. Insulation layers 308 can also be incorporated in the structure of the pulsejet/ejector bank 286 such that pulsejet acoustic levels can be attenuated. Fuel tanks 310 can be integrated. A wing structure 312 can also be incorporated into the pulsejet/ejector bank 286 allowing the pulsejet/ejector bank 286 to be totally enclosed within the fuselage of the aircraft. This reduces the aerodynamic drag of the aircraft and permits the aircraft to achieve supersonic flight (if desirable).

The advantage of providing a plurality of pulsejets 304 for vertical lift capability (separate from a main flight engine) include the redundancy available from the simplified design of the pulsejet engine. Depending upon the safety factor selected, one or more of the pulsejets 304 can fail and the ability of the remaining pulsejets 304 to provide vertical lift for the aircraft provide a redundant safety feature. The simplified nature of the exemplary pulsejet/ejector bank 286 design also provides the advantage that items ingested into the inlet diffusers of each of the pulsejets do not damage the pulsejets. Foreign object damage of this nature would normally destroy a conventional turbine causing mission failure and/or loss of life. This feature is particularly advantageous if an aircraft is landing in an area where debris can be kicked up and ingested into the pulsejets.

Pulsejet engines used for vertical lift capability also provide the additional advantage to operate using a wide variety of fuels. The only significant requirement of the fuel is the fuel must be capable of being atomized in order to be burned. Examples of typical types of fuel that can be used with a pulsejet engine include aircraft (JP, kerosene based) fuel, automobile grade gasoline or diesel, natural gas, alcohol, hydrogen or even a form of coal.

The augmentors used for the pulsejet engine banks of the present invention entrain ambient air and decrease the temperature and velocity of the exhaust gases of the pulsejet engines. By decreasing the exhaust gas temperature and velocity, the pulsejet/ejector engine banks of the present invention can be used over a wider variety of landing areas reducing damage to the landing area. Common VTOL aircraft require a hardened landing area such as concrete or steel. This requirement for a cooled and/or hardened landing area is reduced when pulsejet engine banks of the present invention are used for vertical lift capability of an aircraft. The use of a plurality of pulsejet engines also provides the additional benefit that the individual pulsejet engines can be operated at a lower power level than if fewer numbers of engines are used. A lower operating power results in further reduced exhaust gas temperature and pressure. Reducing the discharge pressure from each pulsejet engine and increasing distributed area by increasing the number of pulsejets also advantageously reduces the chance of debris being kicked up by the exhaust gases and ingested by the pulsejets or main propulsion engine(s) of the aircraft. Although two or fewer pulsejets can be individually mounted in distinct areas of an aircraft, it is preferable that pulsejet banks of approximately 3 or greater pulsejet engines be provided in order to obtain the redundancy and lower exhaust gas temperature and pressure benefits as discussed above.

Figure 23:
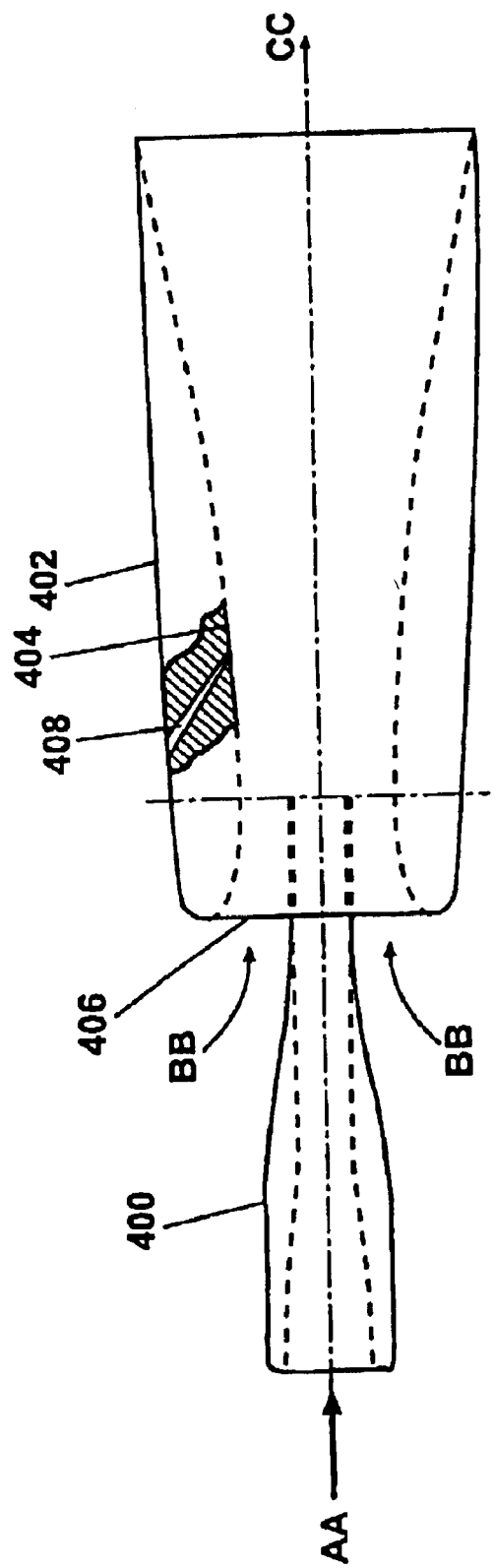
FIG. 23 is a partially sectioned side elevation view of a pulsejet engine and augmentor known in the art.

Referring now to FIG. 23, an exemplary pulsejet 400 is shown attached to an exemplary ejector 402 as known in the art. The discharge from the pulsejet 400 enters the ejector 402 where the flow is constricted in the ejector bore 404. Ambient air enters the pulsejet 400 via air flow direction path AA. Ambient air is also entrained as well as the exhaust from the pulsejet 400 in air inlet 406 in a flow direction BB. Additional ambient air can be entrained in one or more auxiliary air inlets 408. The auxiliary air inlets 408 permit ambient air to enter directly into the ejector bore 404 area of the ejector 402. The combined exhaust of the pulsejet 400 and the ejector 402 exits in the exhaust direction CC.

A VTOL aircraft of the present invention using pulsejet engines arranged in banks offers several advantages. By using separate pulsejet/ejector engine banks which are optimized for vertical takeoff of an aircraft and using independent forward thrust engines which are optimized for forward thrust of the aircraft, both vertical takeoff and forward flight propulsion for the aircraft are optimized rather than compromised as in conventional applications. By integrating structure of the pulsejet/ejector banks with the aircraft structure, aircraft structural loads are partially borne by the pulsejet/ejector structure, therefore reducing the overall weight impact of the pulsejet/ejector engine banks. By providing a plurality of mechanically simple pulsejet engines in each pulsejet/ejector engine bank, redundancy and therefore aircraft safety is increased. Loss of one of the pulsejet engines from a pulsejet/ejector engine bank can be compensated by throttling adjacent engines, changing the attitude controls of the pulsejet cowls, or down-powering an opposite counterpart pulsejet engine. By separating the vertical takeoff capability from the horizontal flight capability, and providing the capability of isolating the inlet and exit ports of the pulsejet engine banks, unrestricted forward flight capability of the aircraft is provided (including supersonic speeds). Also, by incorporating the pulsejet engine banks into the aircraft structure, the wings of the aircraft can also be optimized for forward flight thereby reducing the structure and weight of the aircraft wings.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mobile platform adapted for axial, vertical and transitional motion phases, comprising:
   an axial propulsion system; and
   a vertical propulsion system independent from said axial propulsion system;
   wherein said vertical propulsion system includes at least two pulsejet engines each supportably connected to an augmentor bay having a plurality of discharge apertures, said discharge apertures substantially operably equalizing a pulsejet thrust from each of said pulsejet engines within said augmentor bay prior to the thrust exiting the bay.

2. The mobile platform of claim 1, wherein said at least two pulsejet engines are structurally integrated into said mobile platform such that a structural load of said mobile platform is supportable by at least one of said at least two pulsejet engines and said augmentor bay.

3. An aircraft adapted for axial, vertical and transitional flight phases, comprising:
   an axial propulsion system operable primarily during both said transitional flight phase and said axial flight phase; and
   a vertical propulsion system operable primarily during said transitional flight phase and said vertical flight phase;
   wherein said vertical propulsion system includes at least two pulsejet engines each having a power level throttling capability, each said pulsejet engine supportably connected to a multiply apertured augmentor bay substantially operable to equalize a thrust from each of said pulsejet engines within said augmentor bay prior to the thrust exiting the bay.

4. The aircraft of claim 3, wherein each said pulsejet engine is structurally integrated into said aircraft such that each said pulsejet engine and said augmentor bay supportably carries at least one of a plurality of structural loads of said aircraft.

5. The aircraft of claim 4, wherein each said pulsejet engine is integrally positioned in a fuselage of said aircraft.

6. A flight platform adapted for axial and vertical flight phases comprising:
   an axial flight propulsion system;
   a vertical flight propulsion system;
   said vertical flight propulsion system including at least two pulsejet engines for providing a vertical thrust;
   said body portion including at least one apertured wall operably separating said pulsejet engines, said apertured wall operable to equalize the vertical thrust;
   each said pulsejet engine being integrated with a body portion of said flight platform; and
   each said pulsejet engine operatively acting as one of a plurality of flight platform structural load bearing members.

7. The flight platform of claim 6, wherein said axial flight propulsion system includes at least one axial thrust producing engine supportably received by at least one of said plurality of said flight platform structural load bearing members.

8. The flight platform of claim 7, wherein said at least two pulsejet engines further comprises at least four pulsejet engines being configurable into a plurality of engine banks.

9. The flight platform of claim 8, wherein said plurality of engine banks includes at least two engine banks each having an equivalent quantity of said pulsejet engines.

10. The flight platform of claim 8, wherein each of said plurality of engine banks includes a common structural member forming an individual on of said flight platform structural load bearing members.

11. The flight platform of claim 10, further comprising:
each of said plurality of engine banks including a thrust discharge control device; and
said thrust discharge control device including at least one displaceable cowl.

12. The flight platform of claim 11, further comprising:
each of said plurality of engine banks including an air inlet control device; and
said air inlet control device including at least one displaceable inlet cowl.

13. A vertical takeoff and landing aircraft comprising:
an aircraft having both an axial propulsion source and a vertical propulsion source separate from said axial propulsion source;
said vertical propulsion source including at least two engine banks each having a plurality of pulsejet engines;
each said pulsejet engine of said plurality of pulsejet engines being supportably connected to one of a plurality of augmentor bays, each of said augmentor bays having apertured walls;
said apertured walls operably equalizing a pulsejet thrust from each of said pulsejet engines across said plurality of augmentor bays;
each said augmentor bay being structurally combinable with an aircraft structure such that said aircraft structure is at least partially supportable by said pulsejet engine structure; and
each said pulsejet engine generating each of an ascent thrust and a descent thrust for said aircraft.

14. The aircraft of claim 13, further comprising:
at least one inlet cowl; and
said at least one inlet cowl isolating an air supply to said plurality of augmentor bays.

15. The aircraft of claim 13, further comprising at least one outlet cowl rotatably connectable to said augmentor bays to control each of said ascent thrust and said descent thrust of said aircraft.

16. The aircraft of claim 15, further comprising:
each said outlet cowl being positionable to an augmentor isolation position; and
in said augmentor isolation position each said outlet cowl thereby isolates a discharge portion of said plurality of said augmentor bays.

17. The aircraft of claim 13, wherein each said pulsejet engine is adaptable for operation with a plurality of fuels, each said fuel capable of being atomized for use by said plurality of pulsejet engines.

18. The aircraft of claim 13, further comprising:
each of said plurality of said pulsejet engines having an air inlet diffuser; and
at least one air injection point in each said augmentor bay surrounding each said air inlet diffuser for routing air external to each of said plurality of said pulsejet engines to increase each of said ascent thrust and said descent thrust of said aircraft.

19. The aircraft of claim 18, wherein an air supply surrounding each said air inlet diffuser cools each of said ascent thrust and said descent thrust of said aircraft.

20. A method to provide both vertical and axial propulsion for an aircraft, comprising the steps of:
disposing at least one bank of pulsejet engines on said aircraft;
generating a vertical thrust from said at least one bank of pulsejet engines for vertically propelling said aircraft;
throttling said at least one bank of pulsejet engines to control each of a rate of ascent and a rate of descent of said aircraft;
separating each engine of said at least one bank of pulsejet engines with a dividing plate to operably control a discharge thrust;
disposing a plurality of apertures in each said dividing plate;
controlling at least one axial thrust engine of said aircraft in concert with said at least one bank of pulsejet engines; and
propelling said aircraft in an axial flight path with said at least one axial thrust engine.

21. The method of claim 20, further comprising:
disposing a discharge flow augmentor on each pulsejet engine of said bank of pulsejet engines; and
controlling the discharge thrust with said discharge flow augmentor.

22. The method of claim 21, further comprising:
selectively locating said at least one bank of pulsejet engines on said aircraft about a center of gravity of said aircraft; and
balancing the discharge thrust of each engine of said at least one bank of pulsejet engines about said center of gravity.

23. The method of claim 22, further comprising:
disposing at least two banks of said at least one bank of pulsejet engines on said aircraft; and
throttling a select one of said at least two banks of pulsejet engines to control an attitude of said aircraft.

24. The method of claim 20, further comprising:
positioning said at least one bank of pulsejet engines within a surrounding structure of said aircraft; and
acoustically damping said at least one bank of pulsejet engines on said aircraft using said surrounding structure.

25. The method of claim 20, further comprising:
balancing said discharge thrust of each of said plurality of engines through said plurality of apertures; and
varying each of a quantity and a size of said plurality of apertures to optimize said discharge thrust.

26. The method of claim 20, further comprising:
mounting said at least one bank of pulsejet engines from a common structure; and
supporting an aircraft structural load from said common structure.

27. A vertical takeoff and landing vehicle, comprising:
a vehicle having at least a vertical propulsion source;
at least two engine banks each having a plurality of pulsejet engines operatively forming said vertical propulsion source;

a plurality of conjoined augmentor bays each operably supporting one of said pulsejet engines, said augmentor bays operably joined as sequential pairs, each said pair having a common apertured wall; and a pulsejet thrust of said pulsejet engines in each said engine bank being operably equalized across said common apertured wall of said sequential pairs.

28. The aircraft of claim 27, comprising a vehicle structure combinable with each said augmentor bay such that said vehicle structure is at least partially supportable by said augmentor bay.

29. The aircraft of claim 27, comprising both an ascent thrust and a descent thrust operably generated by each said pulsejet engine for said vehicle.

* * * * *